UNITED STATES PATENT OFFICE.

CHARLES DE VAURÉAL, OF PARIS, FRANCE.

PROCESS OF EXTRACTING GOLD AND SILVER FROM THEIR ORES.

SPECIFICATION forming part of Letters Patent No. 237,217, dated February 1, 1881.

Application filed December 31, 1879.

*To all whom it may concern:*

Be it known that I, CHARLES DE VAURÉAL, of Paris, France, have invented a new and useful Improvement in Process of Extracting Gold and Silver from their Ores; and I do hereby declare that the following is a full, clear, and exact description of the same.

The extraction of gold and silver from complex ores containing sulphur, arsenic, and antimony has been attended hitherto with great difficulties, owing, first, to the great affinity of arsenic and antimony for gold and silver, whereby an appreciable quantity of the precious metals is converted into arsenides and antimonites, thus rendering them unfit for amalgamation, or into arseniates and antimoniates, which are lost in the scoria; second, to the great volatility of arsenic and antimony, which causes considerable loss of silver by volatilization; third, to the necessity of mixing these ores with rich oxidized ores, or with ores of a simple character, so as to diminish the loss and obtain copper of good quality.

The process which I have invented allows me to treat the above-mentioned ores at a low cost, and to extract the gold and silver contained in quantities at least equal and even superior to the fire assay. Moreover, the arsenic and antimony are saved and may be turned to account. In general, the process is applicable to all sulpho-arsenial and sulpho-antimonial ores, and especially to the following: freieslebenite, myargyrite, panabase, polybasite, psaturose, pyrargyrite, proustite, &c.

In carrying out my process the ore is crushed by any convenient means, and when in a finely-divided state subjected to a series of operations, the object of which is to eliminate consecutively the arsenic, the copper, and the antimony. The order of these operations, and the low temperature at which they take place, are important features of my invention.

The arsenic is first completely eliminated. This first operation comes before the roasting of the ore in the presence of air for the oxidation of the copper. If the roasting took place before the elimination of the arsenic, there would be formation of arsenic-fumes, which would carry off a notable quantity of silver. Again, if in this first operation, consisting in the treatment of the ore by hydrogen, the temperature were raised sufficiently to vaporize the antimony contained in the ore, these fumes would carry off part of the silver, and, moreover, the subsequent separation of the arsenic and antimony would be difficult and costly. By treating the crushed ore by hydrogen at a dull-red heat—*i. e.*, at a temperature much below the point of vaporization of antimony—the arsenic, which is more volatile, is completely eliminated as vapor, and mostly in the form of sulphide. It is true that analytically a small amount of antimony is vaporized; but this quantity is so small that it is of no practical account as long as the temperature is not above a dull red. The pulverized ore is introduced into a retort similar to those used in gas-works, and the temperature raised to a dull red, while a current of hydrogen is made to pass through the retort. The sulphides of antimony and of silver are reduced by the hydrogen, there is formation of hydro-sulphuric acid, and the arsenic is vaporized in the form of sulphide of arsenic. These gases are made to pass into a chamber the temperature of which is below the point of condensation of arsenic-vapor, which is thus condensed on the sides of the chamber. The hydro-sulphuric-acid gas free from arsenic-vapor passes into a purifier containing slaked lime in suspension in water, and is here condensed and absorbed. An excess of hydrogen is made to pass through the first retort, so as to reduce the last traces of sulphide of antimony and sulphide of arsenic. That amount of the gas which is not utilized may be made to pass into the second retort, where it serves to reduce the ore in the same way as in the first. This excess of hydrogen only comes into play after the reduction of the ore, so that the work should be so conducted that the excess of gas from the first retort may pass into the second before the elimination of the arsenic has taken place in this ore. This order of operation is economical, but not essential. During the reduction of the ore by hydrogen a certain amount of arsenureted hydrogen is formed, to destroy which it is made to pass into fire on coming out of the purifier.

The reducing action of the hydrogen is an essential feature of this first part of the treatment. The broad idea of using hydrogen as a reducing agent I do not claim as my own; but I do claim its practical application to complex ores for the double purpose of desulphurizing them and of vaporizing or distilling the arsenic as an important feature of my process.

Hydrogen may be produced in any convenient way. I prefer the well-known reaction of steam on spongy iron, such as the result of the reducing action of carbon oxide on limonite. The ore once reduced by the above method has an agglomerated aspect, resembling coke, but extremely friable. When the ore contains sulphide of copper, which it generally does, this is not reduced during the first operation, for sulphide of copper is not decomposed by hydrogen at any temperature. The residuum also contains reduced antimony, antimonite of silver, and the gangue. It may contain gold. The copper is then eliminated in the following way: The ore is crushed and roasted in a reverberatory furnace so constructed as to avoid the intensity of the flame. The flame should be as oxidizing as possible, and the temperature should not rise above a dull-red heat. The sulphide of copper is thus transformed into sulphate and oxide of copper. There is formation of antimonious acid sufficiently volatile to be carried off, and of antimonite of oxide of antimony, which is stable. This last salt is soluble neither in water nor in sulphuric acid, (concentrated or diluted.) It can thus be separated from the copper. The roasted regulus is treated with cold sulphuric acid, the strength of which is 12° Baumé, which dissolves the copper oxide. This reaction, it may be observed, is more rapid with ordinary commercial sulphuric acid, (66°.) The copper is precipitated by treating this solution of oxide of copper with iron. This treatment of the roasted regulus may be so conducted as to bring the solution poorest in acid in contact with the richest part of the roasted regulus. The residuum is free from copper. The antimony is now eliminated. The residuum is washed in water, then treated by concentrated hydrochloric acid in a closed vessel lined with lead. The antimonite of oxide of antimony is transformed into chloride of antimony, which is run off. This operation may be so conducted as to obtain successive lixiviations, which will produce concentrated solutions of chloride of antimony. These are subsequently treated either for antimony or for antimony-vermilion.

The residuum contains all the gold and silver—the latter only as chloride. If there be only chloride of silver present, it may be treated by the bisulphite of soda, which completely dissolves the chloride of silver obtained by the wet method. If the residuum contain both gold and silver, it may be treated by amalgamation or with lead. In this case it is important to dechlorinate the silver by slaked lime in suspension in water, or by a lye of potash with a small quantity of molasses. This reduction is carried on at 100° centigrade. After the consecutive eliminations of the arsenic, the copper, and the antimony, the object of which eliminations is to leave nothing but the precious metals in the residuum, either the dry or the wet method may be employed to extract them.

A great advantage of my invention consists in being able to extract the gold and silver from complex sulpho-arsenical and sulpho-antimonial ores without loss of precious metals, which ores can only be treated with great difficulty either by amalgamation or by the wet or dry method without my process.

What I claim as my invention is—

1. The process of extracting gold and silver from complex sulpho-arsenical and sulpho-antimonial ores, consisting in the following steps, in the order indicated here: first, elimination of the arsenic contained in the ore by treating this with hydrogen at a dull-red heat; second, roasting the ore to oxidize the copper and elimination of the copper by sulphuric acid; and, third, elimination of the antimony by transforming it into chloride by the use of hydrochloric acid, substantially as described.

2. The process of separating the arsenic in sulpho-arsenical and sulpho-antimonial ores which consists in distilling the arsenic from the ore by the aid of hydrogen gas at a dull-red heat, substantially as described.

CH. DE VAURÉAL.

Witnesses:
CHARLES DELSART,
GEORGES G. BOUGAREL.